United States Patent
Färber et al.

(10) Patent No.: US 6,224,147 B1
(45) Date of Patent: May 1, 2001

(54) SLIDING ROOF

(75) Inventors: Manfred Färber, Wielenbach; Wolfgang Ettl, Gräfelfing; Jadi Karami-Malamiri, München; Wolfgang Dittrich, Gilching; Andreas Engl, München, all of (DE)

(73) Assignee: Webasto Karosseriesysteme GmbH, Stockdorf (DE)

( * ) Notice: Subject to any disclaimer, the term of this patent is extended or adjusted under 35 U.S.C. 154(b) by 0 days.

(21) Appl. No.: 09/213,368

(22) Filed: Dec. 17, 1998

(30) Foreign Application Priority Data

Dec. 17, 1997 (DE) .................................... 197 56 020

(51) Int. Cl.$^7$ ...................................................... B60J 7/04
(52) U.S. Cl. ................. 296/216.04; 296/216.08; 296/189; 296/223
(58) Field of Search .................................. 296/223, 188, 296/189, 216.04, 216.05, 35.3, 26.09, 221, 224, 216.08; 188/376, 377; 312/334.44

(56) References Cited

U.S. PATENT DOCUMENTS

| | | | |
|---|---|---|---|
| 2,266,870 | * 12/1941 | Kraeft | 312/334.44 X |
| 2,843,444 | * 7/1958 | Nelson | 312/334.44 X |
| 3,876,263 | * 4/1975 | Oleksiak | 312/334.44 X |
| 4,473,253 | 9/1984 | Lutz et al. | 296/222 |
| 4,626,027 | * 12/1986 | Farmont | 296/223 |
| 4,883,313 | * 11/1989 | Bradley | 296/216.05 |
| 4,923,245 | * 5/1990 | Kuwabara | 296/214 |
| 4,968,088 | * 11/1990 | Schurmann | 296/224 X |
| 4,995,665 | * 2/1991 | Ichinose et al. | 296/223 X |
| 5,167,296 | * 12/1992 | Schreier et al. | 296/223 X |
| 5,486,031 | * 1/1996 | Ronchetti et al. | 296/35.3 X |
| 5,944,371 | * 8/1999 | Steiner et al. | 296/26.09 |

FOREIGN PATENT DOCUMENTS

| | | | |
|---|---|---|---|
| 23 09 320 | 10/1973 | (DE) . | |
| 3223300 | * 12/1983 | (DE) | 296/223 |
| 32 23 300 | 12/1983 | (DE) | 296/223 |
| 4305508 | * 8/1994 | (DE) . | |

* cited by examiner

Primary Examiner—Dennis H. Pedder
(74) Attorney, Agent, or Firm—Nixon Peabody LLP; David S. Safran

(57) ABSTRACT

A sliding roof with at least one slidable and optionally also raisable rigid cover element for selectively closing or at least partially exposing a roof opening of a motor vehicle in which the cover element is guided along at least one roof-mounted guide for a sliding motion between an open position and a closed position and is equipped with a brake mechanism which takes effect only in case of a crash, the brake mechanism remaining inactive during normal movements of the cover element between the open and closed position, and braking the cover element over a path which has a length which is dependent on the acceleration forces which occur during a crash.

12 Claims, 2 Drawing Sheets

SLIDING ROOF

BACKGROUND OF THE INVENTION

1. Field of the Invention

The invention relates to a sliding roof with at least one slidable and optionally also raisable rigid cover element for selectively closing or at least partially exposing a roof opening of a motor vehicle in which the cover element is guided along at least one roof-mounted guide for a sliding motion between an open position and a closed position.

2. Description of Related Art

Sliding roofs are in extensive use in current motor vehicles in a host of configurations, for example, in the form of sliding roofs, sliding and lifting roofs, louvered roofs, etc. In the case of these types of roofs, the roof-mounted guide allows motion of mechanical parts of the movable cover(s) in the longitudinal direction of the motor vehicle (x-direction), however, it limits movements of these mechanical parts in the directions transversely to the longitudinal direction of the motor vehicle (y-direction) and perpendicularly to the roof surface (z-direction). In the event of an accident in which generally the motor vehicle is strongly and suddenly braked in the x-direction, the movable roof parts, i.e., the mechanisms and attached parts, such as louvers or covers, accelerate forward in the x-direction.

In the roofs known from the prior art, mechanical parts and adjacent frame parts can be destroyed as a result of the high deceleration values which occur during an accident, and louvers as well as mechanical and frame parts can detach from the vehicle, and thus, represent a potential danger to motor vehicle occupants and other drivers and pedestrians (see, for example, published German patent applications DE-AS 23 09 320 and DE 31 51 778 A1, as well as German patent DE 32 23 300 C2).

SUMMARY OF THE INVENTION

Therefore, a primary object of this invention is to devise a sliding roof of the initially mentioned type in which provisions are made for increased safety in the case of an accident.

In a sliding roof with at least one slidable and optionally also raisable rigid cover element for selectively closing or at least partially exposing a roof opening of a motor vehicle, in which the cover element is guided along at least one roof-mounted guide for a sliding motion between an open position and a closed position, in accordance with the invention, this object is achieved by a brake mechanism being provided which takes effect only in case of a crash, which remains inactive during normal movements of the cover element between the open and closed positions, and which brakes the cover element over a path which is dependent on the acceleration forces which occur during a crash.

The high acceleration forces which occur during a crash can thus be diverted into the brake mechanism or absorbed thereby, so that the stress acting on the connection sites between the fixed roof surface and the movable roof elements is greatly reduced compared to roof systems in which the roof mechanism suddenly strikes a fixed stop. The path over which braking of the movable roof elements takes place thus depends on the impact momentum of the motor vehicle against a barrier, and thus, on the acceleration forces which occur during the crash. Depending on the strength of the impact, therefore, damage to the roof mechanism can be reduced if not completely prevented, and detachment of parts of the movable roof mechanism or the roof-mounted guide components can be effectively precluded overall.

In particular, the brake mechanism can have a roof-mounted stop and an abutment which keeps up with sliding motions of the cover element, which engages only in case of a crash, and which is connected to the cover element via a mounting. In this case, the stop and/or abutment and/or mounting can be designed and located such that, in the event of a crash, provisions are made for deformation of these components as the cover element brakes and/or that a braking force which increases depending on the path is exerted on the cover element.

In another embodiment of the invention, the brake mechanism can be designed such that, in the event of a crash, in addition to a braking force, also a force component pointed towards the interior of the motor vehicle is exerted on the cover element and/or its mounting. This measure directs the acceleration forces which occur during a crash and which act on the cover element towards the motor vehicle in order to further counteract tearing of the cover element off of its roof mounting.

These and further objects, features and advantages of the present invention will become apparent from the following description when taken in connection with the accompanying drawings which, for purposes of illustration only, a single embodiment in accordance with the present invention.

DETAILED DESCRIPTION OF THE INVENTION

Figure 1:
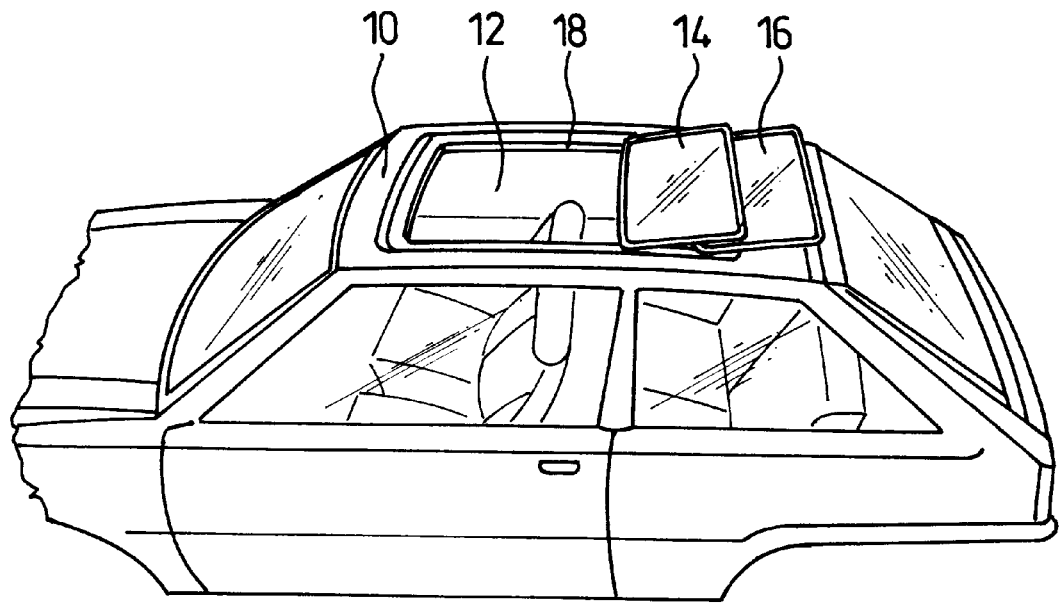
FIG. 1 shows a schematic perspective view of a motor vehicle with a sliding roof in accordance with the present invention.

With reference to FIG. 1, in the fixed roof surface 10 of a motor vehicle, there is a roof opening 12 which can be selectively closed or at least partially exposed by means of cover elements 14, 16 which can slide in the longitudinal direction of the motor vehicle, guided in guide rails 18 which run laterally along the roof opening, and whichcan be raised. Although FIG. 1 shows a lifting and sliding roof with two cover elements, it should be pointed out that the sliding roof configuration described here can be applied to any of those types of roofs in which at least one cover element is guided for sliding motion between an open position and a closed position in a roof-mounted guide. Preferred examples of these roofs are sliding roofs, sliding and lifting roofs, and louvered roofs.

Figure 2:
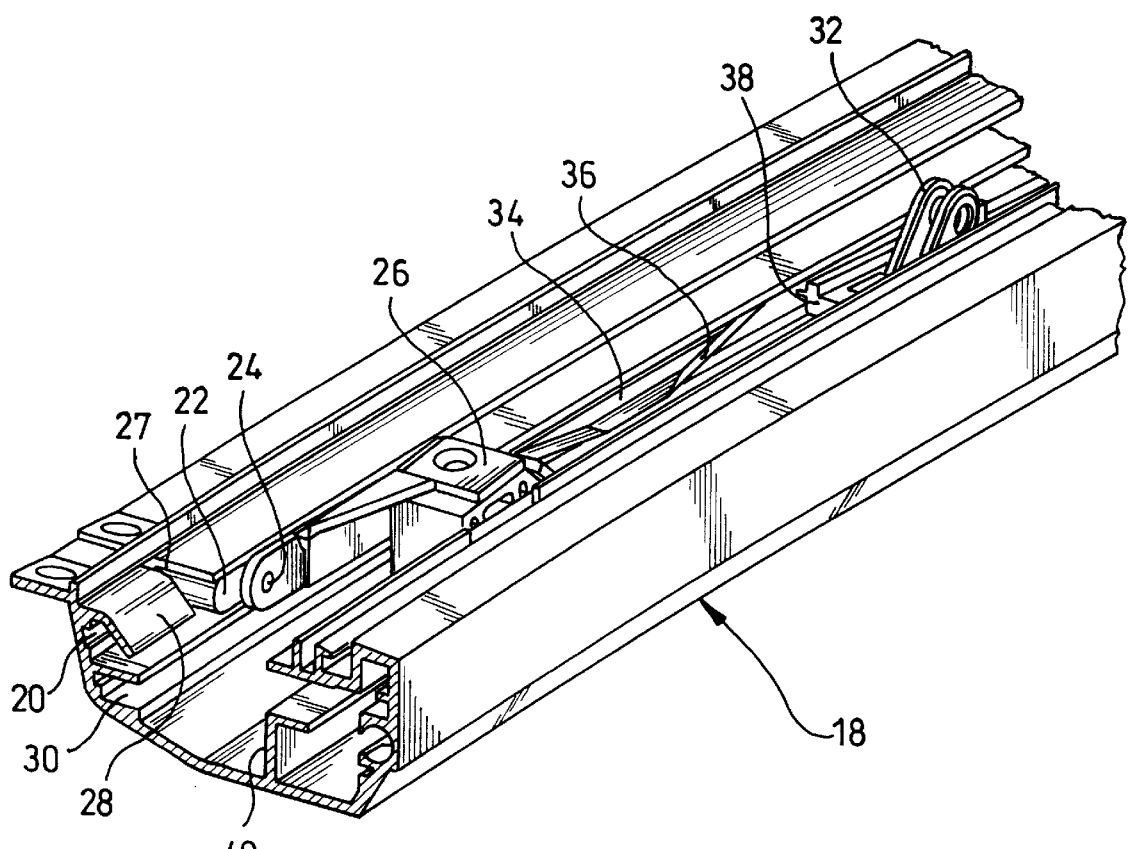
FIG. 2 shows a perspective view of a profile component which has guide rails, in which preferred embodiments of this invention are accomplished.

FIG. 2 shows a profile component 18 which acts as one of the guide rails of the roof from FIG. 1. The profile component 18 shown here is a profile rail with guide paths for the slide shoes of holding elements of a roof cover element 14 or 16 which, besides a raising motion upward, can also execute motion in the longitudinal direction of the motor vehicle. These cover elements 14, 16 are used not only in multiple-cover roofs according to FIG. 1, but also in single cover sliding and lifting roofs and in louvered roofs having numerous slat-shaped cover elements. Generally, in this case, cover element 14, 16 is coupled laterally at two points on each side, in which the front coupling point, on the one hand, in a raising motion acts as a pivot, and on the other hand, as the drive point for sliding movements, and in which raising movements of the cover element can be initiated via the rear coupling point. However, both raising and sliding motions can also be initiated via the rear coupling point.

In the profile component 18 shown in FIG. 2, with reference to the front deflection point of a cover element 14, 16, there is a top guide channel 20 in which a guide shoe 22 is guided which is articulated via a pin 24 to a holding angle 26. The holding angle 26, in turn, is used to attach a cover element 14, 16 as is shown in FIG. 1. In FIG. 2, guide shoe 22 is shown in its end position which is frontmost in normal operation, and in which it cannot move further forward (in FIG. 2 to the left). The upper guide channel 20 which surrounds the guide shoe 22 is generally made U-shaped with an open slot facing the center of the motor vehicle. Near the front end position of the guide shoe 22, in the upper of the legs of the U-shape of the guide channel 20, a slit 27 is made in the section of the upper leg, separating a forward section 28 of it from the part of the guide channel 20 which guides the guide shoe. This forward section 28 is bent into the guide channel 20.

In this way, a roof mounted stop is formed by the inwardly bent forward section 28 which, during normal movements of the cover element 14 guided on the guide shoe 22 between its open and closed position, does not engage the guide shoe 22, but which, however, in the case of an accident in which acceleration forces occur which the roof mechanism can no longer bear, so that the cover is forcefully moved beyond its normal forward end position, forward section 28 represents a stop for braking of the guide shoe 22, which serves as an abutment and thus, the cover element 14 guided thereon. In contrast to conventional roof structures, however, those components of the roof mechanism, by means of which, in the aforementioned crash case, the cover element is braked relative to the fixed roof surface, are not made rigid, but rather deform in a corresponding strong impact of the guide shoe 22 abutting on the stop 28. The choice as to which of the components is designed for deformation in case of a crash or which of the components deforms first in a crash is left in principle to the designer of the motor vehicle in which the roof is incorporated. Thus, the arrangement, for example, can be such that, in the event of a crash, deformation takes place in the pin 24 and/or the holding angle 26. On the one hand, by forming two or more spaced slots 27 with corresponding pre-bent segments (not shown), with a resistance moment against bending which rises to the front, the stiffness of the stop 28 can be varied almost at will so that, here, in addition to or alternatively to deformation of pins and holding angles, a "crumple zone" can be created.

In any case, the cover element 14 is braked over a path which depends on the acceleration forces which occur in a crash, the acceleration forces occurring during braking of the cover element being "softly" directed into the guide rail 18. The danger of the cover element breaking free from its roof-mounted guide, for example, by the holding angle 26 tearing off from the pin 24, can be greatly reduced in this way.

In the design of a stop 28 which deforms in case of a crash, the strength of the other components used for holding the cover element 14 should be considered. Thus, for example, it should be guaranteed that the stop 28 deforms before the connection between the pin 24 and the holding angle 26 can break. It goes without saying that the stop 28 can also be produced from an elastic material, for example, an elastic material which does not permanently deform in a crash, in contrast to the stop shown in FIG. 2. Since, however, it can be assumed that the measures described here are only used when the momentum of the impact of the motor vehicle against a barrier is so strong that the vehicle is irreparably damaged, as described above, a certain deformation of the other roof elements can be allowed, or is even desirable in addition to the permanent deformation of the stop, in order to lengthen the path over which the roof element is braked so as to reliably preclude detachment of the cover element from the motor vehicle.

Another embodiment of the brake mechanism described here is shown in FIG. 2, in conjunction with the rear coupling point of a cover element 14, 16 which is guided along the profile rail 18. Underneath the top guide channel 20 in the profile component 18, another bottom guide channel 30 is formed in which a guide block 32 is guided. In a finish-mounted roof, a lever arm, or carrier (not shown), is coupled to the guide block 32 which, in turn, engages the cover element 14, 16 in order to provide for a raising movement of the cover element 14 or 16 relative to the guide block 32 with the corresponding relative movement of the front and rear coupling points, i.e. of the guide shoe 22.

To decelerate the guide block 32 in case of a crash, in the bottom guide channel 30, near the front end position of the guide block 32, there is a stop 34. The stop surface 36 of the stop 34, i.e. the surface facing the guide block 32, projects in a wedge shape out of the bottom guide channel 30. In the case of an accident in which acceleration forces occur which the roof mechanism can no longer bear, so that the cover is forcefully moved beyond its normal end position, the front face 38 of the guide block 32 strikes the stop surface 36. With continued movement of the guide block 32, the guide block 32 is squeezed with increasing force between the stop surface 36 and an opposite wall surface 40 of the profile component 18, by which an increasing braking force is exerted on the guide block 32.

Figure 3:
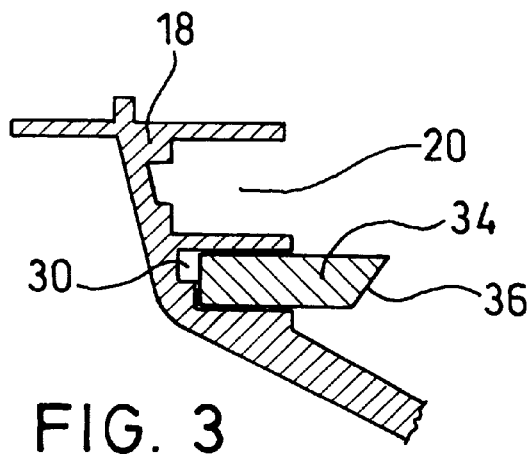
FIG. 3 cross-sectional view of a profile component from FIG. 2.

To illustrate another preferred embodiment of the above described brake mechanism, FIG. 3 shows a sectional view of the profile component from FIG. 2; however, for reasons of clarity, the components guided in the guide paths are not shown. According to FIG. 3, the wedge-shaped stop 34 is made such that its stop surface 36 does not run perpendicular to the direction of motion of the guide block 32, but is inclined down such that when, in case of a crash, the front face of the guide block 32 strikes the inclined stop surface 36, a force component pointed towards the motor vehicle interior acts on the guide block 32, and thus on the cover element 14 or 16 connected to it.

It goes without saying that the above described measures can be combined with one another at will to provide for maximum safety in case of a crash. Thus, compared to the arrangement shown in FIG. 2, in which there are different stops for the front and rear coupling points of the cover element, there could be stops working according to the same principle for all coupling points. Furthermore, provisions can be made for engagement of the measures at different times in which, for example, first, the front stop 28 engages the abutment of the cover element assigned to it in order to provide for initial braking of the cover element 14, after which the rear stop 34 engages the abutment of the cover element assigned to it to further intensify the braking action. Impact on the stops 28 or 34 can likewise take place in the reverse sequence.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. A sliding roof with at least one slidable, rigid cover element for selectively closing and at least partially exposing a roof opening in a fixed roof of a motor vehicle by the cover element being guided along at least one roof-mounted guide in a sliding motion between an open position and a closed position; wherein a brake mechanism is provided which is located out of a path of normal movements between said open and closed positions so that the brake mechanism affects sliding motion of the cover element only in case of a crash, said brake mechanism including at least one stop element which is positionally displaced from surfaces actively involved in driving and guiding the cover element during said normal movements of the cover element between the open and closed positions, said brake mechanism exerting a braking force stopping motion of the cover element over a deceleration path having a length which is dependent on acceleration forces which occur during a crash; wherein said stop element is a roof mounted stop, and wherein the brake mechanism also comprises an abutment which is connected to the cover element via a mounting so as to be displaced with sliding motion of the cover element, said abutment being located relative to said stop so that the abutment engages the stop only in case of a crash; wherein at least one of the stop, the abutment and the mounting has a configuration and location causing a braking force to be applied which increases, during a crash, as motion of the cover element is braked.

2. A sliding roof as claimed in claim 1, wherein at least one of the stop and the abutment is formed of at least one elastic or ductile component.

3. A sliding roof as claimed in claim 1, wherein at least one of the stop and the abutment has a wedge shape.

4. A sliding roof as claimed in claim 3, wherein the wedge shape is angled in a direction causing, in case of a crash, a squeezing of parts of the cover element guided in the guide.

5. A sliding roof as claimed in claim 3, wherein the wedge shape has a stop surface which is inclined relative to vertical and which exerts a force component pointed towards an interior of the motor vehicle on a countersurface of at least one of the cover element and said mounting which interacts with the stop surface in the case of a crash.

6. A sliding roof with at least one slidable, rigid cover element for selectively closing and at least partially exposing a roof opening in a fixed roof of a motor vehicle by the cover element being guided along at least one roof-mounted guide in a sliding motion between an open position and a closed position; wherein a brake mechanism is provided which is located out of a path of normal movements between said open and closed positions so that the brake mechanism affects sliding motion of the cover element only in case of a crash, said brake mechanism including at least one stop element which is positionally displaced from surfaces actively involved in driving and guiding the cover element during said normal movements of the cover element between the open and closed positions, said brake mechanism exerting a braking force stopping motion of the cover element over a deceleration path having a length which is dependent on acceleration forces which occur during a crash; wherein the brake mechanism has an angled shape which, in case of a crash, in addition to said braking force, exerts a force component pointed towards an interior of the motor vehicle on at least one of the cover element and a mounting for the cover.

7. A sliding roof as claimed in claim 6, wherein the cover element is guided at each side on two guide elements which are at a distance from one another in a sliding direction along the roof-mounted guide; and wherein a said brake mechanism is provided for each of the guide elements.

8. A sliding roof with at least one slidable, rigid cover element for selectively closing and at least partially exposing a roof opening in a fixed roof of a motor vehicle by the cover element being guided along at least one roof-mounted guide in a sliding motion between an open position and a closed position; wherein a brake mechanism is provided which is located out of a path of normal movements between said open and closed positions so that the brake mechanism affects sliding motion of the cover element only in case of a crash, said brake mechanism including at least one stop element which is positionally displaced from surfaces actively involved in driving and guiding the cover element during said normal movements of the cover element between the open and closed positions, said brake mechanism exerting a braking force stopping motion of the cover element over a deceleration path having a length which is dependent on acceleration forces which occur during a crash; wherein said stop element is a roof mounted stop, and wherein the brake mechanism also comprises an abutment which is connected to the cover element via a mounting so as to be displaced with sliding motion of the cover element, said abutment being located relative to said stop so that the abutment engages the stop only in case of a crash; wherein the cover element is guided at each side on two guide elements which are at a distance from one another in a sliding direction along the roof-mounted guide; and wherein a said brake mechanism is provided for each of the guide elements; and wherein at, one of the two guide elements, at least one of the stop, the abutment and the mounting has a strength and location causing it to deform, during a crash, as motion of the cover element is braked, while at the other of the two guide points at least one of the stop, the abutment and the mounting has a configuration and location causing a braking force to be applied which increases, during a crash, as motion of the cover element is braked.

9. A sliding roof as claimed in claim 8, wherein the roof-mounted guide comprises guide rails extending along lateral sides of the roof opening and in which guide shoes connected to the cover element are guided, and wherein said brake mechanism applies a braking force to the guide shoes in case of a crash.

10. A sliding roof as claimed in claim 9, wherein the stop element is formed by a part of the guide rail which extends crosswise relative to a path of motion of at least one of the guide shoes.

11. A sliding roof as claimed in claim 10, wherein a section of the guide rail surrounds the guide shoe and is generally U-shaped having a pair of legs; and wherein the stop element comprises a portion of one of the legs which has been cut free and bent into a path of motion of the guide shoe which occurs only in the event of a crash.

12. A sliding roof as claimed in claim 8, wherein the stop is arranged, relative to a longitudinal direction of the roof, in front of an end point of the motion of the abutment occurring for normal movements of the cover element between the open and closed position.

* * * * *